United States Patent

[11] 3,588,912

[72] Inventor Kenneth R. Hackett
Boulder, Colo.
[21] Appl. No. 830,661
[22] Filed June 5, 1969
[45] Patented June 28, 1971
[73] Assignee Phonocopy, Inc.
Wilmington, Del.

[54] ELECTROJUNCTION PRINTING PULSE DRIVER CIRCUIT
6 Claims, 3 Drawing Figs.

[52] U.S. Cl. .......... 346/76, 331/166, 178/6.6
[51] Int. Cl. .......... G01d 15/10
[50] Field of Search .......... 346/76; 331/165, 166; 178/6.6, 94

[56] References Cited
UNITED STATES PATENTS

| | | | |
|---|---|---|---|
| 2,644,738 | 7/1953 | Gardner | 346/76 |
| 3,441,940 | 4/1969 | Salaman et al. | 346/76X |

*Primary Examiner*—Joseph W. Hartary
*Attorney*—Chittick, Pfund, Birch, Samuels and Gauthier

ABSTRACT: A series resonant circuit is connected to a source of power and arranged to be triggered for oscillation through a portion of a complete cycle. A current transformer coupled across the capacitor of the resonant circuit has its high current secondary winding coupled to a low impedance load such as the electrojunction in an electrojunction printing system. Heat buildup in the load is compensated by controlling the time interval between successive oscillatory cycles in accordance with the total number of such cycles which are applied during a printing pulse.

PATENTED JUN 28 1971 3,588,912

Figure 1:
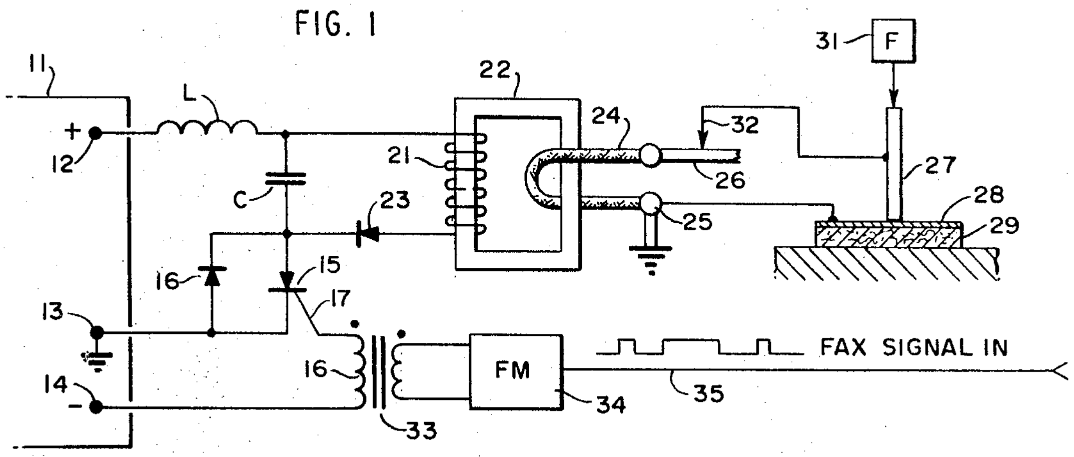

INVENTOR
KENNETH R. HACKETT
BY
Chittick, Pfund, Birch, Samuels & Gauthier
ATTORNEYS

ELECTROJUNCTION PRINTING PULSE DRIVER CIRCUIT

BACKGROUND OF THE INVENTION

This invention relates to the field of high current pulse driver circuits and is particularly useful in driving an electrojunction for the printing process known as electrojunction thermography. Electrojunction thermography is a process of printing which employs a conductive electrode in electrical and thermal contact with a metallic foil or other suitable surface with the junction between the electrode and the foil surface being energized with current impulses to cause localized heating. The foil is thin enough to permit the localized heating to be thermally conductively transmitted through the foil to the opposite surface where it is utilized to produce a visible image in any of a variety of heat responsive image systems. This printing process requires relatively high current levels which, when supplied from either AC or DC sources directly, requires a highpeak current capability in the source and a control device for switching the high currents from the source to the electrojunction particularly when the system is associated with a scanning stylus, so that the image is built up by on and off control of the mark producing current as the stylus scans over the surface of the foil.

Another difficulty which has been encountered in electrojunction thermography is the control of the image formation where the size and character of the image varies considerably. For example, where a series of small spaced dots is to be reproduced, the electrojunction system is essentially in a zero energy state for each dot which is to be reproduced and the entire printing mechanism must be brought into an operative condition by the current impulse which is applied to print a single dot. On the other hand where a continuous image such as a line drawn by a scanning stylus is to be reproduced, a continuous AC or DC current can be applied to the stylus and as the line is printed the energy level of the junction system increases particularly due to temperature rise in the components immediately associated with the junction due to the fact that all of the energy put into the system is not instantly dissipated for steady state current on conditions. If the residual energy state of the system is not taken into account, it has been found that the response of the system, with respect to the image produced, varies in accordance with the size of the image such that if a current magnitude is selected which is adequate to reproduce the smallest dot which the system is called upon to resolve, then that same current magnitude applied for continuous printing results in a tendency to degrade the resolution due to lateral heat flow. On the other hand, if the current magnitude is selected to produce a continuous line image as a stylus scan traverses the foil at a predetermined rate, the image produced by short current pulses representing dots is inadequate to produce a full thermal response and results in an inadequate image.

In accordance with the present invention, an improved driver circuit is provided which can be applied for electrojunction thermography loads by employing a series resonant circuit which is controlled to permit oscillation through a single oscillatory cycle as the unit energy quantum of which printing pulses are composed. By controlling this circuit to supply a predetermined minimum number of such energy quantums for the smallest dot to be resolved and a regular succession of such energy quantums for a continuous print signal, the disadvantages of the prior art are overcome. With the series resonant circuit a relatively simple DC supply can be used and the energy stored in the series circuit effectively converts the low current high voltage DC source into one capable of supplying high currents at low voltage. A suitable current transformer connected across the capacitor of the series circuit supplies a high current pulse whenever the oscillatory circuit is permitted to oscillate. These oscillations are controlled as to the time interval therebetween in order to assure that the constant energy impulses delivered to the load produce a uniform heating effect irrespective of the total number of such pulses delivered in succession for a given print pulse signal. To further enhance the operation of the circuit the current transformer is arranged to return energy stored in the magnetic field of the primary winding as additional charge to the capacitor of the resonant circuit at the end of each pulse thereby increasing the operating voltage level of the system above the voltage obtained from the DC power supply. Thus improved control of the heating effect resulting from a uniform energy increment pulse sequence is obtained while at the same time the cost and the size of the power components which supply and control the energy is reduced in accordance with the principle object of the present invention. In the Drawings:

FIG. 1 is a schematic wiring diagram of the circuit of the invention shown connected for driving an electrojunction thermography load such as would be employed in the facsimile system employing this type of image reproduction.

FIGS. 2A, B and C are waveform diagrams useful in describing the operation of the circuit of FIG. 1.

Figures 2, 3:
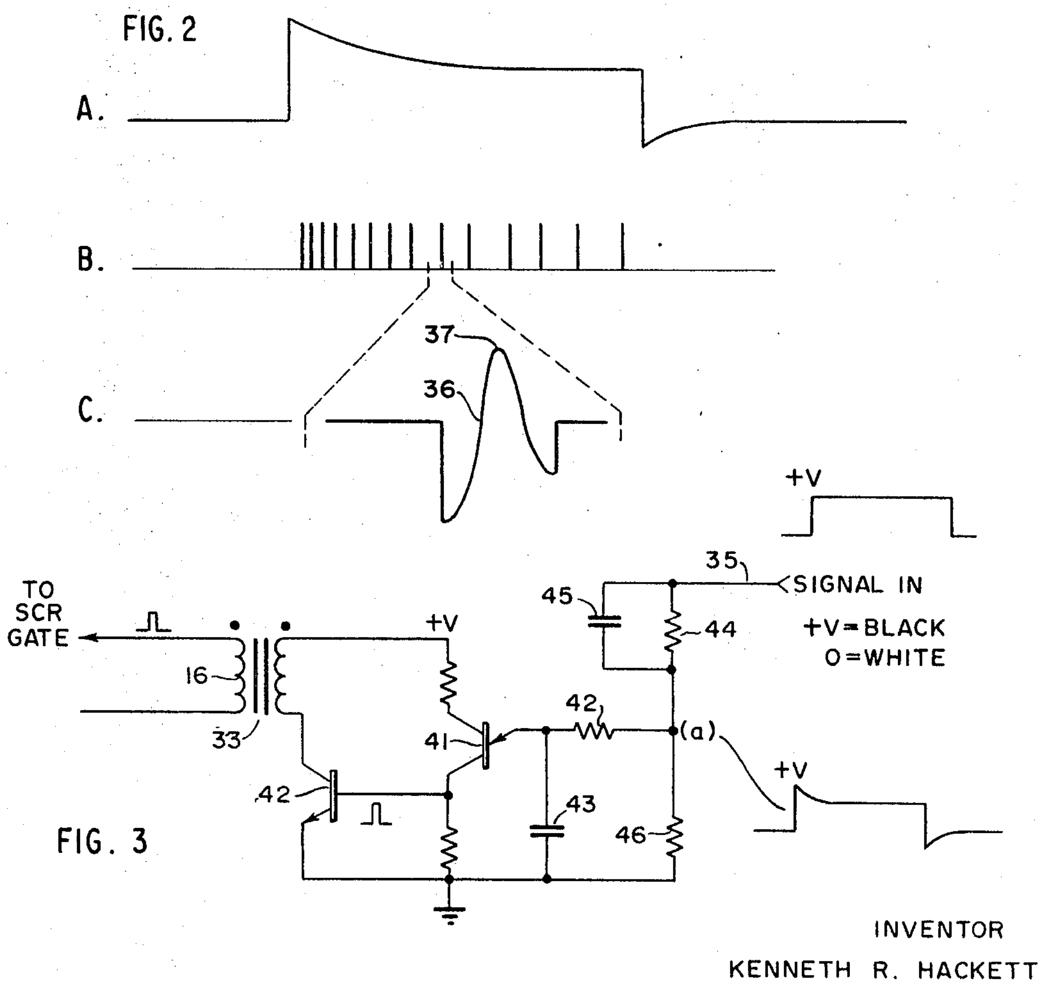

FIG. 3 is a schematic wiring diagram of the time interval modulation circuit employed in FIG. 1.

Referring now to FIG. 1, a DC power supply 11 of conventional size to supply approximately 100 volts positive at terminal 12 relative to ground terminal 13 is provided and has a current capacity of 750 milliamperes typically. The DC supply 11 also provides a negative voltage bias at terminal 14 which has a negligible current capacity. Between terminals 12 and 13 a resonant circuit consisting of inductor L and capacitor C is serially connected with a current control device consisting of SCR 15 interposed between the capacitor C and the ground terminal 13. Paralleling the SCR 15 is a diode 16 poled to conduct the current through the resonant circuit LC in the direction opposite to the direction current is conducted by the SCR 15. The SCR 15 has a control electrode 17 which is connected to a transformer winding 18, the other terminal of which is supplied from negative bias source 14. The SCR 15 is thus biased to nonconductive state except when the AC signal in winding 16 is sufficient to overcome the effect of the negative DC bias from terminal 14.

Across the terminals of the capacitor C a circuit is connected which includes a primary winding 21 of a current transformer 22 and a diode 23. The transformer 22 has a high current secondary winding 24 which may comprise a single turn of a heavy conductor which as shown supplies a ground terminal 25 and a commutator bar 26. While any high current load may be connected across the secondary winding 24, the indicated load in FIG. 1 is a schematic representation of an electrojunction thermography printing system which comprises a stylus 27 in electrical conductive contact with a metal foil 28, the undersurface of which is contacted by a heat responsive printing system 29. The system 29 may comprise a thermal transfer coating on the undersurface of the foil 28 or the application of a heat responsive sheet into contact with the undersurface of the foil 28 or any other suitable marking system of the type disclosed in the U.S. Pat. No. 3,441,940. As indicated, the stylus 27 bears against the foil 28 with a predetermined force 31 and the high current from winding 24 is fed to the stylus 27 by means of a suitable brush assembly 32 which contacts the commutator bar 26. As indicated in FIG. 1, the representation for thermography is highly schematic and obviously the conductors employed will be of size and arrangement suitable for the particular application and the current levels involved.

Pulse generation in the circuit of FIG. 1 is controlled by supplying trigger pulses to transformer 33 which has its primary winding connected to a modulator 34, the input signal of which on line 35 is the video signal or the control signal which determines the duration of each print pulse which is to be supplied by the circuit. The modulator 34 is adapted to generate a plurality of trigger pulses for each input pulse on line 35 with the time interval between the trigger pulses controlled to vary in accordance with the length of the print pulse input on line 35. Thus for the shortest pulse duration on line 35, at least two trigger pulses will appear from the output of modulator 34 and these trigger pulses appearing in secondary winding 16 will trigger the SCR 15 to conduct for each such trigger pulse. For longer print pulses on line 35 a long succession of trigger pulses will be applied to SCR 15 and a corresponding greater plurality of energy impulses will be delivered by the system.

Referring now to FIG. 2, the operation of the circuit of FIG. 1 will be described. The print pulses on line 35 are converted in the modulator 34 into pulses of the type shown in FIG. 2A where the initial amplitude of the pulse is high and it decreases in amplitude gradually to a uniform amplitude after predetermined time. The output of the modulator 34 provides a series of trigger pulses as shown in FIG. 2B, the time interval between successive trigger pulses being generally in accordance with the amplitude of the wave shown in FIG. 2A. Thus if the wave shown in FIG. 2A is extremely short only two closely spaced impulses of FIG. 2B will appear. As shown in the drawings, a pulse of greater than minimum duration in FIG. 2A produces a succession of trigger pulses, as shown in FIG. 2B, with the time interval spacing between the trigger impulses gradually increasing to a uniform spacing at the end of the extended print pulse interval.

During each of the trigger pulses of FIG. 2B the circuit of FIG. 1 goes through one oscillatory cycle as shown in FIG. 2C. When the trigger impulse occurs in the secondary winding 16 the SCR 15 conducts and the DC charge on condenser C from power supply 11 discharges so that the voltage across conductor L appears as the waveform 36 in FIG. 2C. The waveform 36 is actually a cycle of the resonant oscillation for the circuit composed of L and C which according to well-known theory reaches a peak and reverses direction as at 37. Upon reversal of polarity the SCR 15 ceases to conduct, but the diode 16 being poled opposite to the SCR 15 permits conduction to continue for a second half-cycle, after which the next current reversal interrupts conduction since the SCR 15 will not reinitiate conduction in the absence of another trigger pulse from winding 16. The exact shape of the oscillatory wave 36 in FIG. 2C is a damped sine wave due to the resistive component reflected into the resonant circuit by the load and other losses. Accordingly, the trigger pulse produces the signal represented in FIG. 2C and this single cycle of oscillation effectively drives the primary winding 21 of transformer 22 to produce a quantum of energy into the load connected to winding 24 of a predetermined constant magnitude. As previously described, when a succession of trigger pulses according to FIG. 2B are applied to the SCR 15 the total energy to the load is made up of a plurality or sum of the constant quantum energies associated with a single oscillatory cycle of FIG. 2C. At the end of the oscillatory cycle the energy contained in the magnetic field of transformer 22 acts as a voltage source in primary winding 21 and by means of diode 23 is applied to capacitor C with a proper polarity to add to the voltage from the power supply 11. In this manner, the total voltage charge on capacitor C builds up after a succession of print pulses on line 35 so that in effect the series circuit LC is charged to a higher voltage level than the supply voltage from power supply 11. This further enhances the energy transfer characteristics of the system resulting in greater effective power for given size components or permits the power supply 11 to be smaller and more economical than would otherwise be possible.

Referring now to FIG. 3, the circuit of modulator 34 will be described for converting the print pulse signal on line 35 into the respective signals shown in FIGS. 2A and B. The modulator 34 comprises a unijunction transistor oscillator 41 which oscillates at a frequency determined by the time constant of an RC charging circuit 42–43 and the voltage at point (*a*). With 0 volts at point (*a*) the oscillator 41 does not oscillate and this is the signal condition corresponding to white in the facsimile signal train appearing at input terminal line 35. When a black or print signal appears on line 35 the voltage at point (*a*) is positive causing the oscillator 41 to oscillate at a frequency which is determined by the magnitude of the voltage at point (*a*). This voltage magnitude is time variable as a result of capacitor 45 connected across resistor 44 in the voltage divider made up of resistor 44 and resistor 46. Thus for print signals of substantial duration the time constant produced by capacitor 45 alters the essentially rectangular input signal into a signal having a variable voltage magnitude at the initial portion as described in connection with FIG. 2A. Thus during this high voltage initial period of a sustained print signal the oscillator 41 will oscillate at a higher frequency than during the latter portions of a sustained signal. This higher oscillator frequency will also exist for short print pulses since the time constant effect produced by capacitor 45 will not operate to lower the voltage at point (*a*) during short print pulses.

The output of unijunction oscillator 41 is coupled to a driving transistor 47 which drives the primary of transformer 33 shown in FIG. 1. Thus the SCR 15 of FIG. 1 is driven by a succession of pulses such as shown in FIG. 2B whenever a print pulse appears on line 35 to trigger the print power pulses to the printing system.

The arrangement described provides for a simple and economical lightweight power supply using relatively inexpensive components and yet it provides a high current pulse to the printing system which is controlled in accordance with the facsimile information signal. Each printing pulse within the information signal is made up of a plurality of individual pulses and the frequency of these pulses varies in a manner suitable to produce uniform printing with nonreturn to zero print signals irrespective of the duration of the individual printing increment. By recovering the magnetic energy in the system to increase the operating voltage level an effectively high energy state can be obtained from a given set of components. Thus the circuit is ideally suited for lightweight portable equipment such as telephone-type facsimile systems.

I claim:

1. A printing system comprising:
an electrojunction formed by the conductive pressure contact between a printing stylus and a thin electrically and thermally conducting foil;
a pulse transformer having a high current secondary connected across said electrojunction;
means for driving the primary of said pulse transformer with a train of information controlled print pulses each print pulse composed of a plurality of time-spaced wave alternations; and
means for controlling the time spacing between said wave alternations.

2. Apparatus according to claim 1 including means for increasing said time spacing during a print pulse in accordance with the length of said print pulse.

3. Apparatus according to claim 2 including means for generating at least two spaced wave alternations during the shortest print pulse and means for gradually increasing the number and time spacing between said alternations as the duration of said print pulse increases.

4. Apparatus according to claim 3 and including means for spacing said alternations substantially uniformly after said print pulse exceeds a predetermined time duration.

5. A current driver for a low impedance load comprising:
a series resonant circuit having an inductor and capacitor in series;
a power supply connected across said series resonant circuit for charging said capacitor;
a signal controlled means operative when triggered to initiate oscillatory current flow in said resonant circuit for a portion of a complete cycle; and
a current transformer having a primary winding coupled across said capacitor and a secondary winding coupled to said load.

6. Apparatus according to claim 5 and including unilateral conducting means in the coupling between said capacitor and said primary winding poled to conduct during said cycle and thereafter to charge said capacitor from said primary winding to increase the charge stored in said capacitor.